Figure 1:
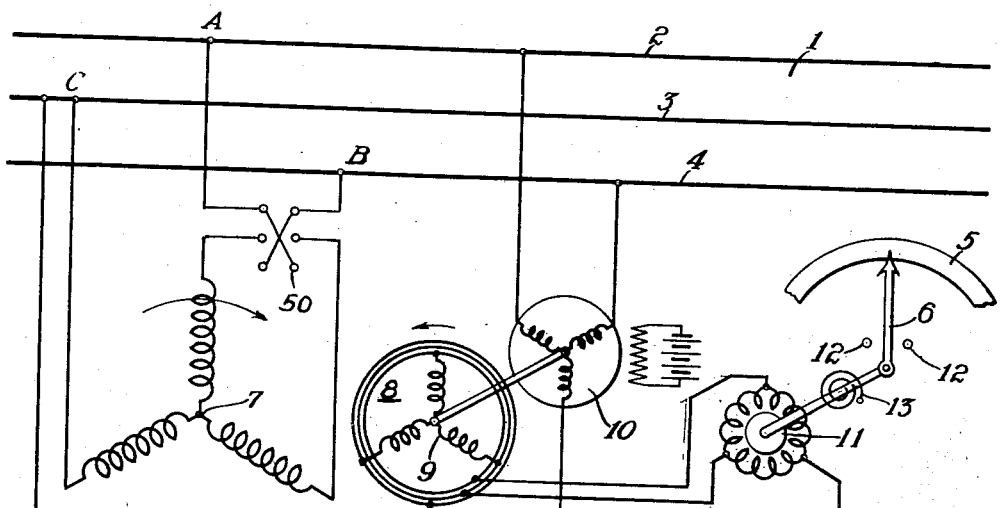

April 28, 1925.

C. LE G. FORTESCUE ET AL 1,535,593

ELECTRICAL MEASURING DEVICE

Filed Feb. 13, 1920

3 Sheets-Sheet 1

WITNESSES:
H.J.Shelhamer
J.H.Procter

INVENTORS
Charles LeG. Fortescue
Lewis Warrington Chubb
Joseph Slepian
BY
Wesley G. Carr
ATTORNEY April 28, 1925.

C. LE G. FORTESCUE ET AL 1,535,593

ELECTRICAL MEASURING DEVICE

Filed Feb. 13, 1920      3 Sheets-Sheet 2

WITNESSES:

INVENTORS
Charles Le G. Fortescue
Lewis Warrington Chubb
Joseph Slepian
BY
ATTORNEY

April 28, 1925.

C. LE G. FORTESCUE ET AL

1,535,593

ELECTRICAL MEASURING DEVICE

Filed Feb. 13. 1920

3 Sheets-Sheet 3

WITNESSES:

INVENTORS
Charles LeG. Fortescue
Lewis Warrington Chubb
Joseph Slepian
BY

ATTORNEY

Patented Apr. 28, 1925.

1,535,593

UNITED STATES PATENT OFFICE.

CHARLES LE G. FORTESCUE, OF PITTSBURGH, AND LEWIS WARRINGTON CHUBB, OF EDGEWOOD, PENNSYLVANIA, AND JOSEPH SLEPIAN, OF BOSTON, MASSACHUSETTS, ASSIGNORS TO WESTINGHOUSE ELECTRIC & MANUFACTURING COMPANY, A CORPORATION OF PENNSYLVANIA.

ELECTRICAL MEASURING DEVICE.

Application filed February 13, 1920. Serial No. 358,373.

*To all whom it may concern:*

Be it known that we, CHARLES LE G. FORTESCUE, a subject of the King of Great Britain, and a resident of Pittsburgh, in the county of Allegheny and State of Pennsylvania; LEWIS WARRINGTON CHUBB, a citizen of the United States, and a resident of Edgewood, in the county of Allegheny and State of Pennsylvania; and JOSEPH SLEPIAN, a citizen of the United States, and a resident of Boston, in the county of Suffolk and State of Massachusetts, have invented a new and useful Improvement in Electrical Measuring Devices, of which the following is a specification.

Our invention relates to means for, and methods of, measuring electrical quantities.

One object of our invention is to provide a measuring device that shall indicate one symmetrical component of an unbalanced electrical quantity.

Another object of our invention is to provide a measuring device, of the above indicated character, that shall indicate the unbalance factor of a polyphase circuit.

A further object of our invention is to provide a measuring device, of the above indicated character, that shall be simple and inexpensive to construct and that shall provide an accurate and effective means for charging for electrical energy.

It is a well known fact that the method of charging for electrical energy on a straight watthour basis is not satisfactory as it does not take into consideration factors of great importance. That is, it has been determined that, when the various phases of a polyphase circuit are unequally loaded or unbalanced, which is the usual, rather than the unusual, condition, the capacity of the generator is reduced. Also, a given amount of energy, taken on a single-phase load, will cause greater losses and greater reduction in the capacity of the feeder conductors than with the same amount of energy taken as a polyphase load. An unbalanced load will produce an unbalanced voltage which cannot be corrected by the use of stationary apparatus. A further error in the present methods of measurement is that power-factor meters which indicate correctly on balanced loads will indicate incorrectly on unbalanced loads. This leads to the inevitable conclusion that some measure of this unbalance must be obtained in order to properly charge for energy furnished. That is, the customer must be penalized for consuming energy in such unbalanced form as to reduce the capacity of the generator and the feeder conductors, while the customer, who consumes his load in such form that it assists the generator, must be given a premium. It has been shown in the paper entitled "Method of symmetrical co-ordinates applied to the solution of polyphase networks" by C. Le G. Fortescue, published in the proceedings of the American Institute of Electrical Engineers, June 28, 1918, that any unbalanced polyphase system of quantities may be resolved into a number of balanced or symmetrical components or quantities. That is, an unbalanced three-phase system may be resolved into three symmetrical components, one of positive phase sequence, one of negative phase sequence and one of zero phase sequence. The zero phase sequence component of voltage is zero when delta or line-to-line voltages are considered and the zero phase sequence component of current is zero when no current traverses the neutral conductor. In other words, the usual unbalanced system may be resolved into two symmetrical systems of positive and of negative phase sequences. These components have, for convenience, been termed positive-rotational, or positive-sequence and counter-rotational, or negative-sequence, components, and the counter-rotational component of current is a measure of the current unbalance. A useful factor in the proper measurement of energy is the ratio of the positive and the counter-rotational components, and this may be referred to as the unbalance factor.

In carrying out our invention, we provide a measuring instrument and means connected between the instrument and the circuit to cause the instrument to indicate in accordance with a double-frequency voltage which is the result of cutting, at a fixed rate, the field set up by one symmetrical component of the quantity to be measured. This is usually obtained by connecting the stator of an induction motor to the circuit and synchronously rotating the rotor thereof which is connected to the measuring instrument.

Figure 2:
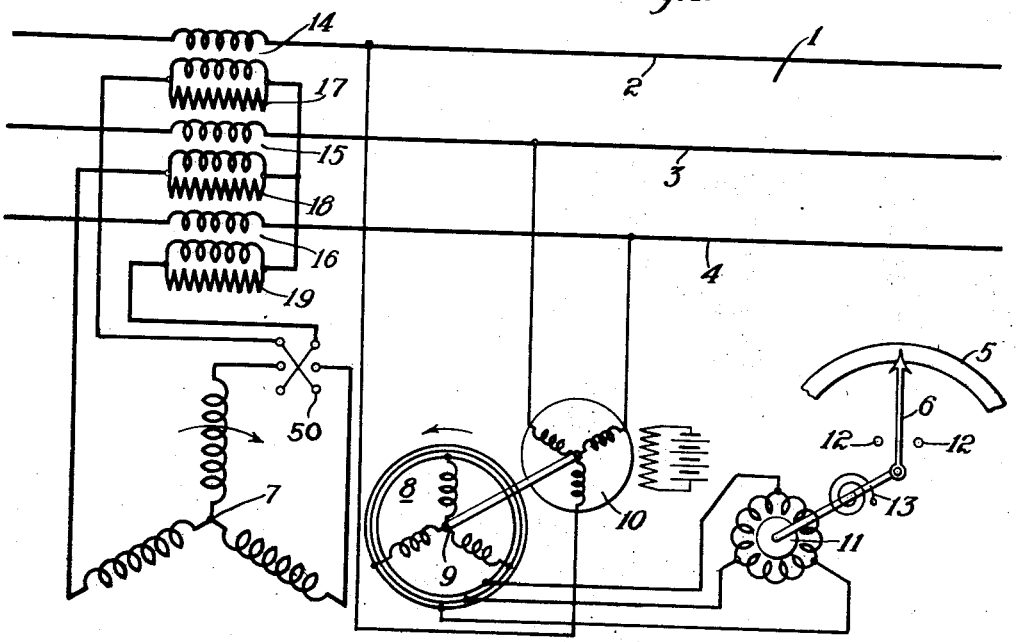
Figure 3:
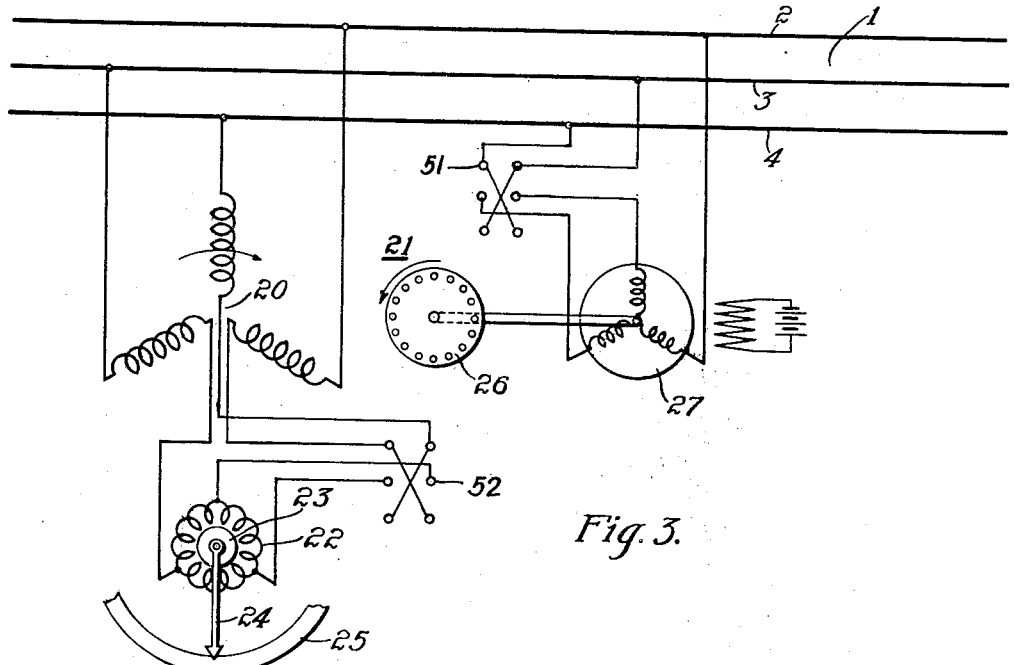
Figure 4:
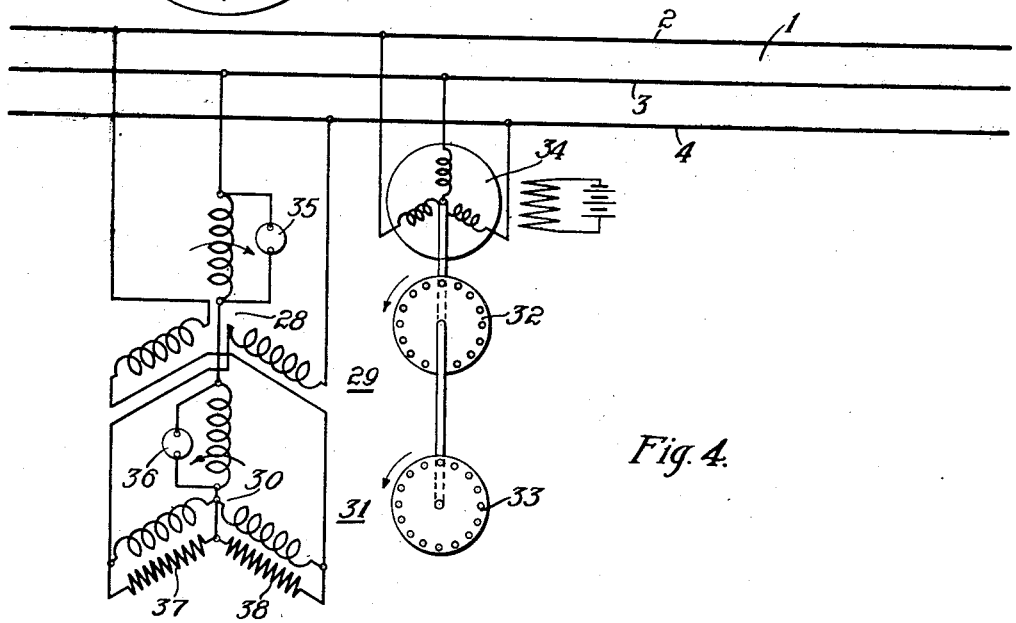
Figure 5:
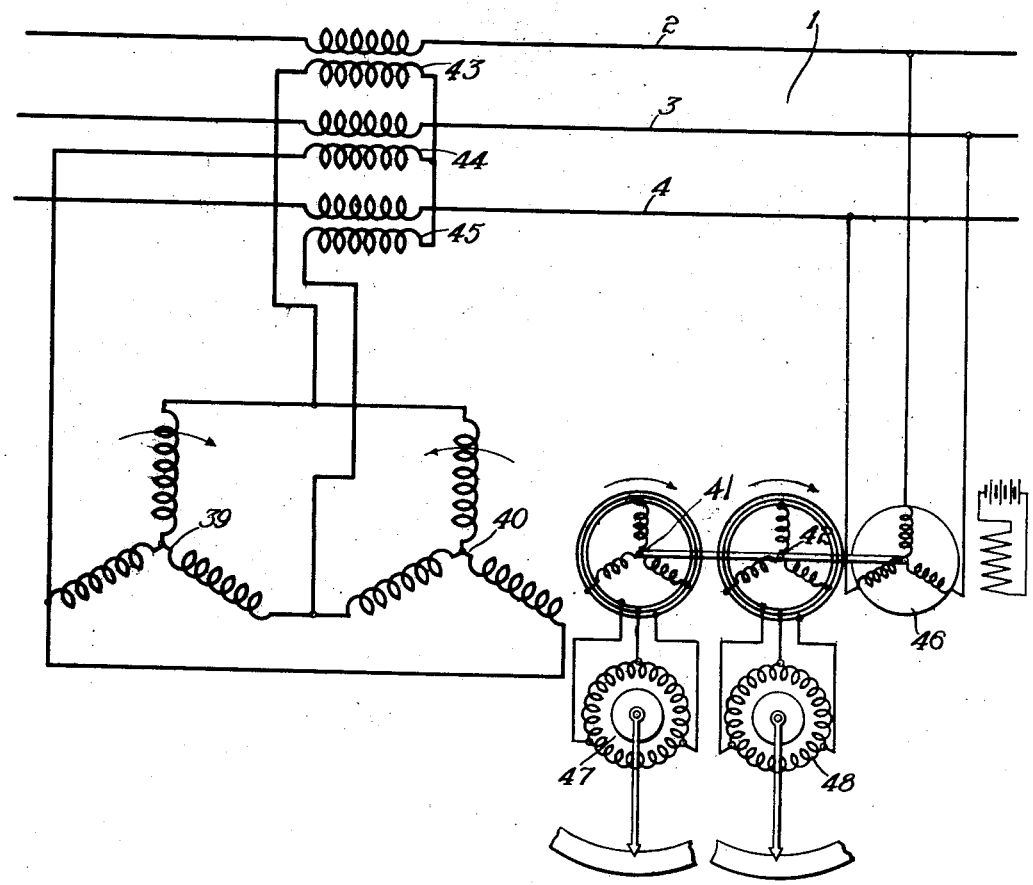

Figure 1 of the accompanying drawings is a diagrammatic view of a measuring device embodying our invention; Fig. 2 is a diagrammatic view of a current-measuring device embodying our invention, and Figs. 3 and 4 are diagrammatic views of modified forms of potential-measuring devices embodying our invention, and Fig. 5 is a diagrammatic view of a modified form of current-measuring device embodying our invention.

In Fig. 1 of the drawings, a three-phase circuit 1 comprises conductors 2, 3 and 4, across which unbalanced voltages are impressed or across which the voltages are unbalanced by reason of an unbalanced load being taken therefrom. It is desired to indicate, on a scale 5, by means of a pointer 6, either the positive or the counter-rotational component of the unbalanced voltage of the circuit 1. To accomplish this, the stator windings 7 of an induction motor 8 are connected to the circuit 1, and the rotor windings 9 are driven synchronously by a synchronous motor 10 which is also connected to the circuit 1. The windings 9 of the rotor of the motor 8 are connected to a relatively small torque motor or meter 11 in this instance shown as an induction motor which constitutes an indicating instrument or which may be provided with contact members 12 to constitute a relay device. With the stator windings 7 of the motor 8 connected as shown, and the rotor driven by the motor 10, synchronously, in a direction as indicated opposite to that in which it would normally rotate, a double-frequency voltage will be induced in the windings which is a measure of the positive phase-sequence voltage. This voltage is impressed on the indicating motor 11 which operates against a spring 13 to cause its pointer 6 to indicate the positive phase-sequence voltage.

Since the unbalanced three-phase voltage will produce both rotating fields simultaneously in the windings 7 in magnitudes proportional to the relative magnitudes of the two symmetrical components of the unbalanced voltage, it will be seen that the conductors of the rotor will not cut the field caused by the voltage component of the sequence rotating in the same direction as the rotor rotates but it will cut the field which rotates in the opposite direction and it will cut this field in such manner as to induce a double-frequency voltage therein which is a measure of the phase-sequence component to be measured. In order to determine the negative phase-sequence voltage, it is only necessary to reverse the connections of the winding 7 to two of the conductors 2, 3 and 4, which may be done by throwing the switch 50. This causes the conductors of the windings 9 to intercept the flux of the opposite rotation and, consequently, the motor 11 will be provided with a double-frequency voltage which is a measure of the negative phase-sequence component. This same result may be obtained by reversing the motor 10 but, if this is done, the motor 11 must have a zero position at the center of the scale 5, as the pointer 6 reverses when the motor 10 is reversed.

The synchronous motor 10 and the rotor windings 9, when operating, constitute a modifying or sifting device for selecting one symmetrical component of the unbalanced voltage and impressing it upon the indicating meter 11.

In a grounded system, the occurrence of a ground upon any conductor introduces a zero-phase sequence component. This component is absent, however, during conditions of balance or of unbalance, as long as no ground occurs on any conductor.

In Fig. 2 of the drawings, the circuit 1, having conductors 2, 3 and 4, is provided with three current transformers 14, 15 and 16, the secondary windings of which are connected in star to the stator windings 7 of the induction motor 8 the rotor windings 9 of which are connected to a torque motor 11 similar to the devices described with respect to Fig. 1 of the drawings. The secondary windings of the transformers 14, 15 and 16 are shunted by resistors 17, 18 and 19, respectively. With this arrangement, voltages are impressed across the windings 7 of the motor 8 that are proportional to the direct and counter-rotational components of the currents traversing the circuit 1 and in phase with the currents. The motor 11 will be supplied with a double-frequency voltage which is a measure of the positive or counter-rotational component of the current depending upon the relative direction of movement of the rotor 9 with respect to the rotation of the symmetrical components of the voltage impressed on the windings 7. It is only necessary to throw the switch 50 to reverse the connections of two of the conductors of the windings 7 to obtain the other component.

In Fig. 3 of the drawings, the circuit 1 is provided with three conductors 2, 3 and 4, and the stator windings 20 of the motor 21 are connected, substantially as shown, in series with the stator windings of the torque motor or meter 22. The rotating element 23 of the motor 22 is connected to a pointer 24 which co-operates with a scale 25 to indicate one symmetrical component of the unbalanced voltage of the circuit 1. The squirrel-cage rotor 26 of the motor 21 is operated synchronously by a synchronous motor 27 that is connected to the circuit 1. With this device, the motor 22 will be supplied with voltage which is a measure of one symmetrical component of the unbalanced voltage impressed on the circuit 1, depending upon which direction the rotor 26 of the motor 21 is actuated. That is, the pointer 24 will indicate positive phase-sequence component when the rotor 26 turns in one direction, and negative phase-sequence component when the rotor 26 turns in the other direction. The selective action is caused by the damping action of the squirrel-cage winding of the rotor 26 of the motor 21. The field that rotates in the same direction as the rotor is unaffected and the field rotating in the opposite direction to the rotor 26 is damped out and the impedance of the primary winding 20 substantially reduced to zero for this component. It will be understood that, when the motor 27 is reversed by the switch 51, two of the conductors to the meter 22 must be reversed by the switch 52 to preclude the meter from indicating backwardly.

In Fig. 4 of the drawings, the primary or stator windings 28 of an induction motor 29 are connected in series with the stator windings 30 of a motor 31. The squirrel-cage rotors 32 and 33 of the motors 29 and 30 are driven, at synchronous speed, by a synchronous motor 34 that is connected to the circuit 1. A single-phase voltmeter 35 is connected across one phase of the winding 28. Similarly, a single-phase voltmeter 36 is connected across one phase of the winding 30. Reactors 37 and 38 may be connected across the other phases to balance the system which may be unbalanced by the meter 36. With this arrangement, when the rotors 32 and 33 are turned in one direction, the meter 35 will indicate positive phase sequence and the meter 36 will indicate negative phase sequence. It will be understood that the windings 28 offer high impedance to one component and the windings 30 offer high impedance to the other component, thus permitting the separation of the two components.

In Fig. 5 of the drawings, the stator windings 39 and 40 of two induction motors having rotor windings 41 and 42 are connected to the secondary windings 43, 44 and 45 of three series transformers, the primary windings of which are connected in circuit with the conductors 2, 3 and 4 of the circuit 1. The windings 39 and 40 are so connected that the current components rotate therein in opposite directions. The rotor windings 41 and 42 are actuated synchronously in the same direction by a motor 46 that is connected to the circuit 1. The winding 41 is connected to a torque motor or meter 47 and the winding 42 is connected to a torque motor or meter 48.

With the arrangement shown in Fig. 5 of the drawings, one meter indicates the direct rotational component and the other meter indicates the counter-rotational component of the unbalanced current traversing the circuit 1. The operation is apparent as one rotating component influences the winding 41 and the other the winding 42 as these two components rotate oppositely in the windings 39 and 40.

The negative phase-sequence component is indicated by the pointer 6, shown in Fig. 2, and, as shown by one meter in Fig. 5, is a measure of the current unbalance and may be called the unbalanced-current component. Also, the ratio between the indication of the pointer 6, shown in Fig. 2, when the same indicates the negative phase sequence and when it indicates the positive phase sequence, or the ratio of the indications of the meters 47 and 48, is the unbalance factor of the circuit and it is a measure by which a customer should be penalized in the computation of energy charges.

By the use of the system herein set forth, various factors, such as the positive and negative phase-sequence components of volt amperes, watts and also the power factor of an unbalanced circuit, may be calculated. These quantities are deemed to be of value in the computation of energy charges and may be computed from the indications, as given by the simple systems illustrated.

Our invention is not limited to the specific structures illustrated, as it may be variously modified without departing from the spirit and scope of the invention, as set forth in the appended claims.

We claim as our invention:

1. Means for measuring a quantity of a polyphase circuit comprising a dynamo-electric machine embodying rotor and stator windings, the stator windings being connected to the circuit, means connected to the circuit for synchronously actuating the rotor windings of the machine and indicating means operatively connected to the rotor windings.

2. Means for measuring a quantity of a polyphase circuit comprising a wound-rotor induction motor, the stator of which is connected to the circuit, means connected to the circuit for synchronously actuating the rotor of the machine and a measuring instrument operatively connected to the windings of the rotor.

3. Means for measuring a quantity of a polyphase circuit comprising an induction dynamo-electric machine, the stator of which is connected to the circuit, means connected to the circuit for synchronously actuating the rotor of the machine and a measuring instrument electrically connected to the rotor.

4. Means for measuring a quantity of a polyphase circuit comprising an electro-responsive device and modifying means connected between the circuit and the device to cause the device to be actuated in direct proportion to a symmetrical component of a quantity of the circuit, under predetermined conditions in the circuit.

5. Means for measuring a quantity of a polyphase circuit comprising an indicating device and means connected between the circuit and the device to cause the device to indicate in direct proportion to a symmetrical component of a quantity of the circuit under predetermined conditions in the circuit.

6. Means for measuring a quantity of a polyphase circuit comprising an indicating device and means connected between the indicating device and each phase of the circuit to cause the device to indicate in accordance with the value of a symmetrical component of a polyphase quantity to be measured, under predetermined conditions in the circuit.

7. Means for measuring a quantity of a polyphase unbalanced circuit comprising an indicating device and means connected between the indicating device and the circuit to cause the device to indicate a single quantity which is one of a plurality of balanced quantities into which an unbalanced polyphase quantity may be resolved, under predetermined conditions in the circuit.

8. Means for measuring a quantity of a three-phase unbalanced circuit comprising a polyphase motor meter and means connected between the meter and the circuit whereby the meter is caused to indicate a quantity which is one of a plurality of balanced quantities into which an unbalanced quantity of the circuit may be resolved.

9. Means for measuring a quantity of a polyphase unbalanced circuit comprising an electro-responsive device and sifting means connected between the device and the circuit to cause the device to operate in proportion to a quantity which is one of a set of symmetrical quantities into which an unbalanced polyphase quantity of the circuit may be resolved.

10. Means for measuring a quantity of a polyphase unbalanced circuit comprising an electro-responsive device and means connected between the device and the circuit whereby the device operates in proportion to a current quantity which is one of a plurality of sets of symmetrical quantities into which the unbalanced currents of the circuit may be resolved.

11. Means for measuring a quantity of a polyphase unbalanced circuit comprising an electro-responsive device, and a rotating device connected between the electro-responsive device and the circuit to cause the electro-responsive device to be actuated in accordance with a quantity which is one of a plurality of sets of symmetrical quantities into which an unbalanced quantity of the circuit may be resolved.

12. Means for measuring a quantity of a polyphase unbalanced circuit comprising an electro-responsive device, a dynamo-electric machine, one member of which is connected to the circuit, means for synchronously driving the other member of the machine with respect to the first-mentioned member, and means for so connecting the other member to the electro-responsive device that the electro-responsive device is actuated in accordance with the double-frequency voltage that is the result of cutting, at a fixed rate, the field set up by a symmetrical component of a quantity of the circuit.

13. Means for measuring a quantity of a polyphase unbalanced circuit comprising an electro-responsive device, a dynamo-electric machine running at substantially synchronous speed, one member of which is connected to the circuit, and means for so connecting the other member to the electro-responsive device that the electro-responsive device is actuated in accordance with the double-frequency voltage that is the result of cutting the field set up by a symmetrical component of a quantity of the circuit at a fixed rate.

14. The method of determining one of three symmetrical quantities into which an unbalanced quantity of a three-phase system may be resolved, which consists in measuring a double-frequency voltage which is the result of cutting, at a fixed rate, the field set up by a symmetrical component of the unbalanced quantity.

15. Means for measuring a quantity of a polyphase circuit comprising an electro-responsive device and two windings moving relatively to each other at synchronous speed and so operatively connected between the electro-responsive device and the circuit that the electro-responsive device is actuated in accordance with a quantity which is one of a plurality of sets of symmetrical quantities into which the unbalanced quantities of the circuit may be resolved.

16. Means for measuring a quantity of a polyphase circuit comprising an electro-responsive device and means connected between the circuit and the device to control the energization of the electro-responsive device in accordance with one phase-sequence component of a polyphase electrical quantity.

17. In a polyphase electric circuit, the combination with an electro-responsive device, of rotating means connected between the circuit and the device to cause the electro-responsive device to be actuated in accordance with one symmetrical component of a polyphase electrical quantity in the circuit.

18. In a polyphase electric circuit, the combination with an electro-responsive device, of sifting means connected between the circuit and the device to cause the device to be actuated in accordance with one symmetrical component of the unbalanced current traversing the circuit.

three symmetrical currents into which the unbalanced current of a three-phase system may be resolved which consists in measuring a double-frequency voltage which is the result of cutting, at a fixed rate, the field set up by a phase-sequence component of the current traversing the system.

20. In a polyphase circuit, the combination with a measuring device, of modifying means connected to the circuit and to the device and having such characteristics that the measuring device is actuated in accordance with a function of the degree of unbalance of the circuit.

21. In a polyphase circuit, the combination with a measuring device, of rotatable means connected between the circuit and the measuring device to cause the measuring device to be actuated in accordance with a function of the degree of unbalance of the circuit.

22. In a polyphase circuit, the combination with an electro-responsive device, of means for so modifying the energization of the device from the circuit that it is actuated in accordance with one symmetrical component of a polyphase electrical quantity.

23. In an unbalanced polyphase circuit, the combination with an electro-responsive device, of means for so controlling the energization of the device from the circuit that it is actuated in accordance with a function of the degree of unbalance of the circuit.

24. The method of determining one of three symmetrical quantities into which an unbalanced quantity of a three-phase system may be resolved which consists in measuring a double-frequency voltage which is the result of cutting, at a fixed rate, the field set 19. The method of determining one of up by the said symmetrical component of the quantity.

25. The combination with a polyphase circuit, of a dynamo-electric machine embodying rotor and stator windings, the stator windings being connected to the circuit, means connected to the circuit for synchronously actuating the rotor windings of the machine, and an electro-responsive device connected to the rotor windings.

26. The combination with a polyphase circuit having an unbalanced characteristic, of an electro-responsive device, and modifying means connected between the circuit and said device to cause the device to be actuated in accordance with a symmetrical component of said characteristic.

27. Means for measuring a quantity of an unbalanced polyphase circuit comprising a plurality of electrical windings, one of said windings being connected to the circuit, means for synchronously rotating another of said windings with respect to the first-mentioned winding, and an electro-responsive device connected to one of said windings to be actuated in accordance with a characteristic of the unbalanced circuit.

28. Means for measuring a quantity of an unbalanced polyphase circuit comprising a plurality of electrical windings, one of said windings being connected to the circuit, and an electro-responsive device connected to one of said windings to be actuated in accordance with a symmetrical characteristic of the unbalanced circuit.

In testimony whereof, we have hereunto subscribed our names.
CHARLES LE G. FORTESCUE.
LEWIS WARRINGTON CHUBB.
JOSEPH SLEPIAN.

CERTIFICATE OF CORRECTION.

Patent No. 1,535,593.          Granted April 28, 1925, to

CHARLES LE G. FORTESCUE ET AL.

It is hereby certified that error appears in the printed specification of the above numbered patent requiring correction as follows: Page 5, line 40, strike out " 19. "The method of determining one of" and insert the same as line 1, of the page; and that the said Letters Patent should be read with this correction therein that the same may conform to the record of the case in the Patent Office.

Signed and sealed this 19th day of February, A . D. 1929.

(Seal)

M. J. Moore,
Acting Commissioner of Patents.